(12) United States Patent
Hsu et al.

(10) Patent No.: US 6,522,093 B1
(45) Date of Patent: Feb. 18, 2003

(54) METHOD FOR DRIVING A BRUSHLESS DC MOTOR

(75) Inventors: Chia-Chang Hsu, Hsinchu (TW); Chih-Shih Yang, Hsinchu (TW)

(73) Assignee: Prolific Technology, Inc., Taipei (TW)

( * ) Notice: Subject to any disclaimer, the term of this patent is extended or adjusted under 35 U.S.C. 154(b) by 0 days.

(21) Appl. No.: 09/930,148

(22) Filed: Aug. 16, 2001

(51) Int. Cl.$^7$ .................................................. H02P 1/18
(52) U.S. Cl. ....................................................... 318/254
(58) Field of Search ................................. 318/254, 138, 318/439, 700, 712

(56) References Cited

U.S. PATENT DOCUMENTS 5,376,866 A * 12/1994 Erdman ...................... 318/254
5,493,188 A * 2/1996 Yoshikawa et al. .......... 318/254
5,872,442 A * 2/1999 Gotou .......................... 318/138

* cited by examiner

Primary Examiner—Rita Leykin
(74) Attorney, Agent, or Firm—Sughrue Mion, PLLC (57) ABSTRACT

A method for driving a brushless DC motor is disclosed in accordance with the present invention. Firstly, a driving control signal is generated based on sensed information of a motor rotor's magnetic field distribution. The driving control signal is inactive in the case that four rotor magnetic arcs are rotated more or less than critical positions of the rotor corresponding a stator. At that time, no magnetic fields are produced from the motor's stator, and thus the rotor rotates by inertial force. In another case, the driving control signal is issued in a conventional manner.

22 Claims, 6 Drawing Sheets

METHOD FOR DRIVING A BRUSHLESS DC MOTOR

BACKGROUND OF THE INVENTION

1. Field of the Invention

The present invention pertains to a method for driving a brushless DC motor, more particularly, to a method for driving a brushless DC motor, in which a stator of the motor selectively stops providing a magnetic field for a rotor based on the angular position of the rotor corresponding to the stator.

2. Description of the Prior Art

Motors are well known and widely used in electrical and electronic industries. A conventional motor utilizes windings as its internal rotor, in which two ends of the armature windings are continuously interchangeably coupled to external circuits through the rotating process of the rotor and thereby direction commutation for the current on the armature is ruled. Using this scheme for the motor rotation, motor brushes are apt to be worn away through mechanical rubbing against the rotating contacts. This not only causes increased impedance and bad contact with external circuits, but also gives off a spark when bad contact has occurred. In a brushless DC motor, windings are wound around the stators, and permanent magnets are used as rotors. Electronic circuits are applied instead to control current flow direction commutation through windings and thus the polarity distribution of the magnetic field is continuously interchanged. Through such a strategy, no contact switching is required, and mechanical contact attrition is effectively avoided.

Figure 1:
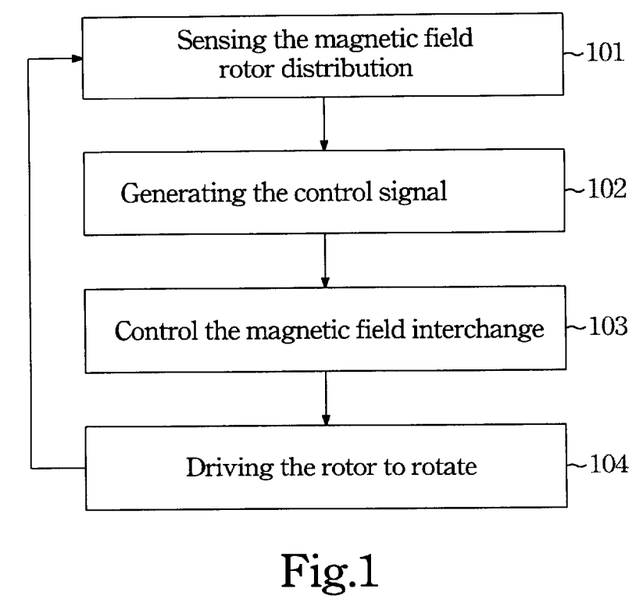
FIG. 1 is a flow chart used in prior art, which describes a method for driving a brushless DC motor.

The mechanism of driving the brushless DC motor is described in the flow chart of FIG. 1. A Hall sensor (or Hall IC) is adopted to sense the magnetic field rotor distribution (Step 101). According to the sensing information, a driving control signal is then generated (Step 102). The driving control signal is issued to determine the current's direction on the stator windings. The magnetic field polarities induced by the current are then interchanged with the alternated current direction (Step 103). Since the induced magnetic field exerts a force on the permanent magnets of the rotor, the rotor is then rotated in a predetermined direction (Step 104).

Figure 2A:
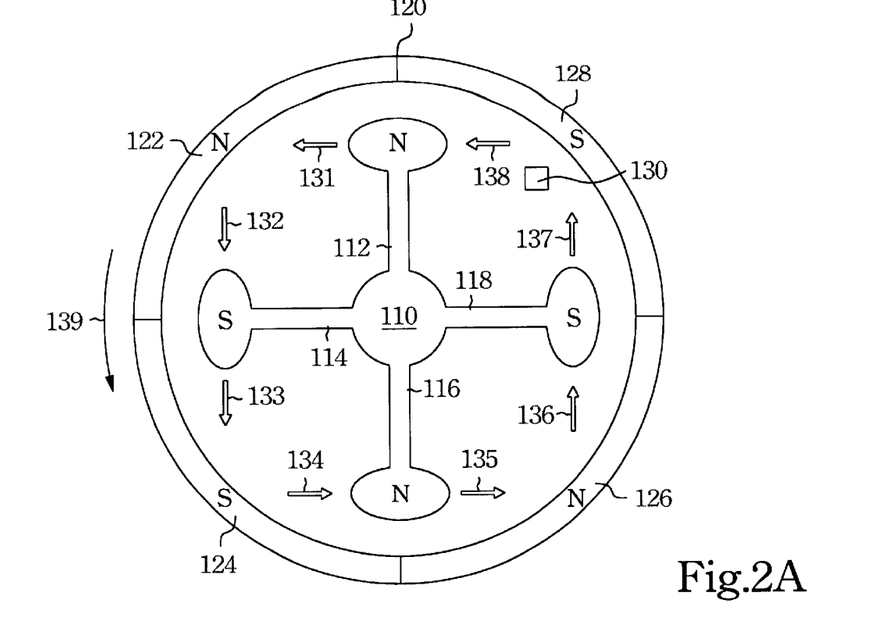
FIG. 2a to FIG. 2d are cross sectional views of the brushless DC motor, which each illustration the magnetic interactions between the rotor and the stator in each figure.

The magnetic interactions between the rotor and the stator and the rotation mechanism of the brushless DC motor are illustrated in FIG. 2a to FIG. 2d. In FIG. 2a, the four arms 112, 114, 116 and 118 of the stator 110 points respectively to the four joints of the four magnetic arcs 122, 124, 126 and 128 of the rotor 120, wherein every two neighboring arcs have a joint between them. A Hall sensor 130 is located on the angle bisector of the arms 112 and 114 and near the rotor 120. The Hall sensor 130 is capable of sensing the magnetic field irradiated from the S-polar magnetic arc 124. Based on the sensed information, a driving signal is generated to control the current's direction on the windings and thus the polarities of the four magnetic arms, which are shown in FIG. 2a. Therefore, the magnetic field irradiated from the four arms of the stator will exert magnetic force on the magnetic arcs of the rotor. The force directions by the four arms of the stator on the rotor are approximately presented as the hollow arrows 131 to 138.

As an example of the N-polar magnetic arc 122, the N-polar magnetic arc 122 both receives an attractive force 132 by the arm 114 and a repulsive force 131 by the arm 112. The tangent components (the forces are tangent to the rotor) of the two forces 132 and 131 on the circular rotor create a resultant force, which will drive the rotor to rotate counterclockwise in an angular acceleration motion manner (the vector of the angular acceleration is perpendicular to and penetrates through the sheet). Similarly, the S-polar magnetic arc 124 both receives an attractive force 134 by the arm 116 and a repulsive force 133 by the arm 114. The tangent components of the two forces 134 and 133 on the circular create a resultant force, which will also drive the rotor to rotate counterclockwise in an angular acceleration motion manner. In addition, N-polar arc 126 and the S-polar arc 128 also receive the same magnetic interactive mechanism. Therefore, the motor rotor 120 will rotate counterclockwise, indicated as the direction of the arrow 139, about the central point (the joint of the four arms) of the stator (the joint of the four arms).

Figure 2B:
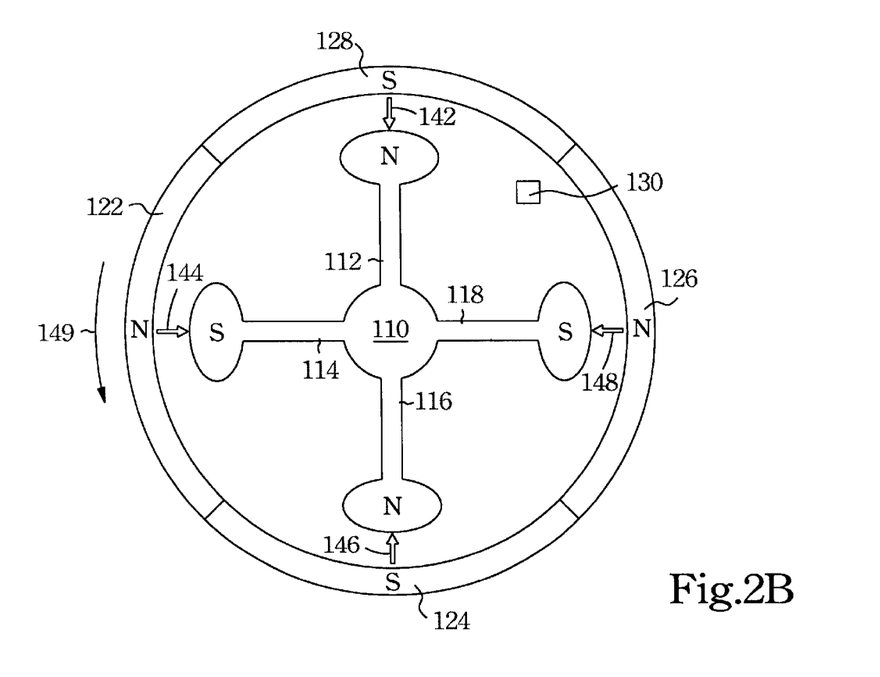

As the motor rotor 120 rotates counterclockwise from FIG. 2a to FIG. 2b, the magnetic arms 112, 114, 116 and 118 of the stator 110 point to the center of the four magnetic arcs of the rotor 120, respectively. Thus the four rotor magnetic arcs 122, 124, 126 and 128 will receive four centripetal magnetic forces, which points to the center of the stator as the hollow arrows 142, 144, 146 and 148 in FIG. 2b show, by the stator 110. Obviously, the tangent components of the magnetic force on the rotor 120 is zero, and thus the rotor 120 will not accelerate in a tangent direction. At this time, the rotor 120 will continue rotating counterclockwise owing to inertial mechanism. Now the Hall sensor is located near the joint and along the angle bisector of the S-polar 128 and N-polar 126 magnetic arcs, and thus senses a zero net magnetic field.

Figure 2C:
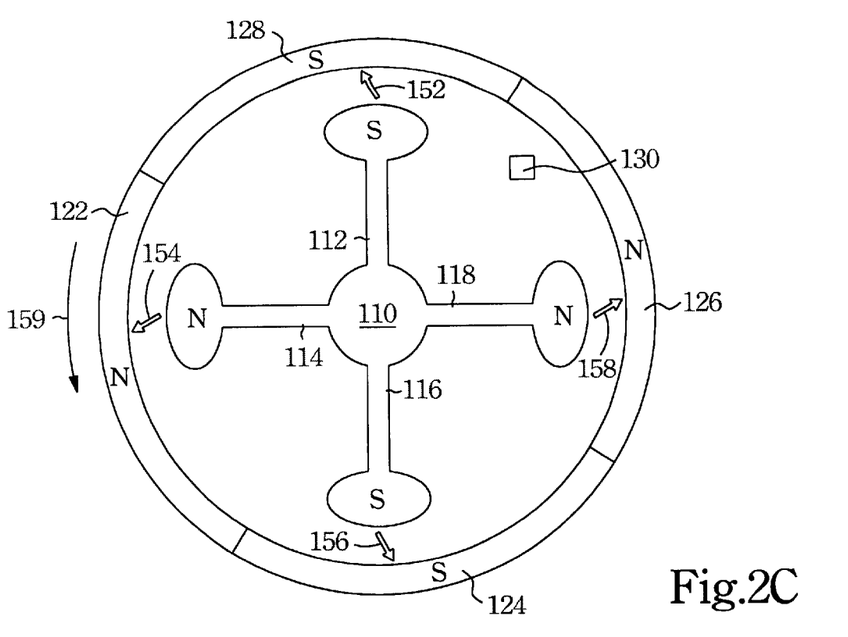

When the rotor 120 rotates counterclockwise to the angular position corresponding to the stator in FIG. 2c from that in FIG. 2b, the Hall sensor is slightly deviated from the position corresponding to the rotor 120 as compared to that in FIG. 2b and thus senses magnetic force from the N-polar magnetic arc 126. A driving control signal is in turn issued to change the direction of the current flowing though the stator windings, and thus the polarity commutation of the magnetic field induced by the direction changeover of the current is achieved. After the current's direction changeover, the stator's four arms polarities are depicted in FIG. 2c. In FIG. 2c, the arms 112 and 116 are S-polar, while the arms 114 and 118 are N-polar. Then, the rotor's magnetic arcs are exerted, small amounts of tangent force by the stator's arms, and the four magnetic arcs force receptive directions are indicated as the hollow arrows 152, 154, 156 and 158. Thus, the rotor 120 continues rotating counterclockwise in an accelerating manner.

Figure 2D:
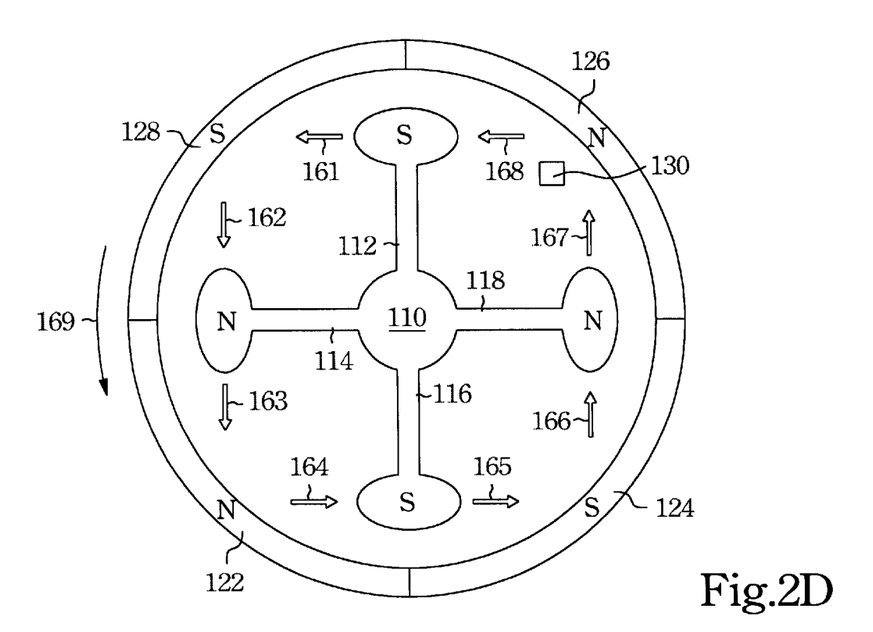

When the rotor 120 rotates counterclockwise to the angular position corresponding to the stator in FIG. 2d from that in FIG. 2c, the rotor's magnetic arcs polarity distribution and the stator's magnetic arms is just the opposite to that in FIG. 2a. The repulsive force 131 and 135 in FIG. 2a is now replaced by the repulsive force 161 and 165 in FIG. 2d, wherein the repulsive force 161 and 165 are the same as the repulsive force 131 and 135 both in direction and quantity. The same magnetic mechanism happens to the repulsive forces 133 and 137 in FIG. 2a and 163 and 167 in FIG. 2d also. However, the attractive forces 134 and 138 in FIG. 2a are now replaced by the attractive force 164 and 168 in FIG. 2d, wherein the attractive forces 134 and 138 are the same as the attractive forces 164 and 168 both in direction and quantity.

According to the rotating mechanism described above, the rotor has the maximum angular acceleration for rotating in the case as FIG. 2a. Then, the angular acceleration gets smaller and smaller and then becomes zero when it corresponding to the angular position related to the stator in FIG. 2b. At that time, the angular positions of the four magnetic arcs of the rotor corresponding to the stator are called critical positions, and the angular position of the rotor is called a critical position.

In a case where the polarities of magnetic arms are kept constant, four arms of the stator generates tangent accelerations opposite to the rotating direction, after the rotor rotates across the critical position, and thus the rotating speed of the rotor is decreased. To achieve a desired continuous positive acceleration for the rotor, the polarities of the arms must change whenever the rotor reaches the critical position. Once the polarities of the arms are regularly interchanged, the rotor's rotation, and thus the motor, is steadily maintained. Unfortunately, signals transmitted in electronic circuits undesirably have inherent delays. The driving control signal for changing the direction of the current flowing through the stator windings unexceptionally encounters this. When the Hall sensor acquires the rotor's four magnetic arcs arrival information at the critical positions, a driving control signal for a current's direction switching is then issued. Within the momentary interval for sensing of the Hall sensor and the driving control's transmission signal based on the sensed information, the rotor's magnetic arcs must have fast passed the critical positions. At this time, force exerted on the rotor opposite to the rotating direction is undesirably produced.

Once the reverse force is generated, the rotor's reverse acceleration is followed. Under such a condition, the motor's rotating efficiency is decreased because of the canceling out of the clockwise and counterclockwise tangent force. In addition, the reverse magnetic force will make the rotor's rotation less smooth when working, and cause increased friction between machine parts. Moreover, the chattering and scraping phenomena within mechanical deviation tolerance will appeared, which will not only render the rotor to make significant noise, but shorten the lifetime of the motor.

SUMMARY

In view of the drawbacks inhered in the conventional brushless DC motor that produces reverse interactive force and exerts force on the rotor when the rotor passes through the critical position due to delay of an electric control signal through wires on the circuit board. A need to drive the motor with high efficiency and low noise is thus created. To pursue this, the present invention discloses a method for driving a brushless DC motor. In the method, winding current is inactive on some intervals when a rotor's four arcs are rotated slightly more or less than critical positions. This is done so that the rotor can rotate smoothly in a predetermined direction, during which time it suffers no affect by the reverse interactive force caused by the electric driving control signal's delay time. Thus, the poor rotating efficiency encountered in prior art is significantly improved.

The method for driving the brushless DC motor is detailed below: Firstly, a Hall sensor is used to acquire the magnetic field's information distribution of the motor rotor. Based on the information acquired, the driving control signal is successively generated. When the rotor is rotated to be within a critical area, the driving control signal is inactive and thus no magnetic field is produced by the stator. At this time, the rotor keeps rotating action inertial. However, when the rotor is not within the critical interval, the driving control signal is issued to drive the stator to produce a magnetic field in a conventional manner so that the motor rotates with an acceleration at the interval.

BRIEF DESCRIPTION OF THE DRAWINGS

In order for the invention to be more clearly understood, it will now be disclosed in greater detail when taken in conjunction with the accompanying drawings, wherein.

DESCRIPTION OF THE PREFERRED EMBODIMENT

A method for driving a brushless DC motor is disclosed herein according to the present invention. In the method, current windings are inactive by a driving control signal on some intervals when a rotor's four magnetic arcs are rotated more or less than critical positions so that the rotor is rotating smoothly in a predetermined direction all the time and is suffering no affect by a reverse interactive force caused by the delay of the electric driving control signal. Thus, the working efficiency of the motor rotor is improved.

Figure 3:
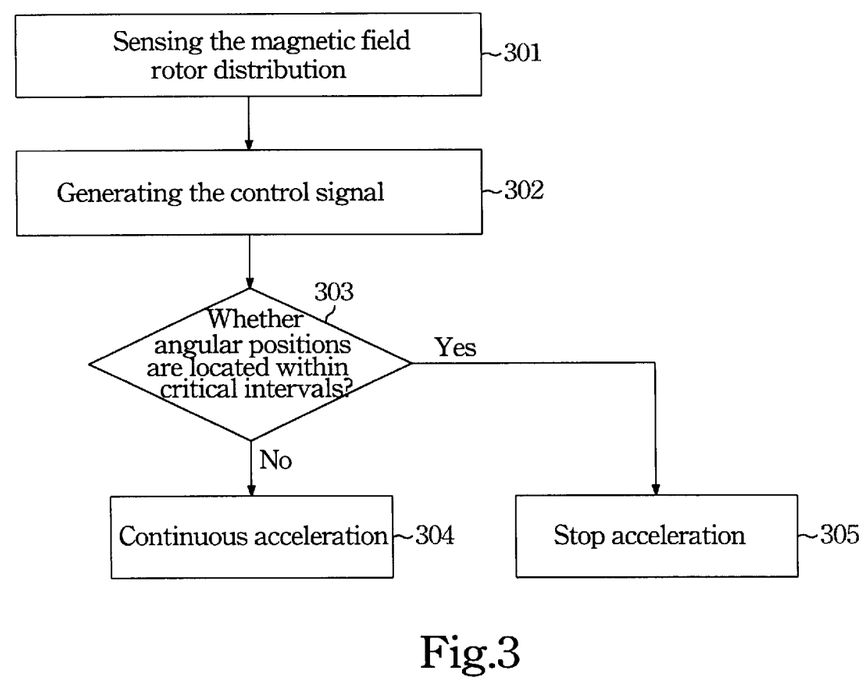
FIG. 3 is a flow chart according to the present invention, which describes a method for driving the brushless DC motor.

The method for driving the brushless DC motor can be explained and described in the flow chart in FIG. 3. In the beginning, a Hall sensor is used to sense a rotor's magnetic field distribution information (Step 301). Based on the information acquired, the driving control signal is then generated (Step 302). The driving control signal is varied according as to whether angular positions of the rotor's four magnetic arc centers are located within critical intervals (Step 303). Where the centers of the rotor's four magnetic arcs are rotated to be slightly more or less than the critical positions. Once the rotor passes the critical position, the magnetic field produced by the motor's stator will then be interchanged. When the centers of the rotor's four magnetic arcs are not within critical intervals, the driving control signal is generated and issues the stator's magnetic field to produce in a conventional manner. At this time, the rotor is accelerated to rotate continuously (Step 304). When the rotor's four magnetic arm centers are within critical intervals, current windings on the stator is inactive by the driving control signal. At this time, the stator produces no magnetic field (no current flows through the stator windings), and thus no magnetic forces are exerted on the rotor. In this case, the rotor obtains no acceleration tangent to the rotor, and thus the rotor continues to rotate at an inertial manner (Step 305).

Figure 4:
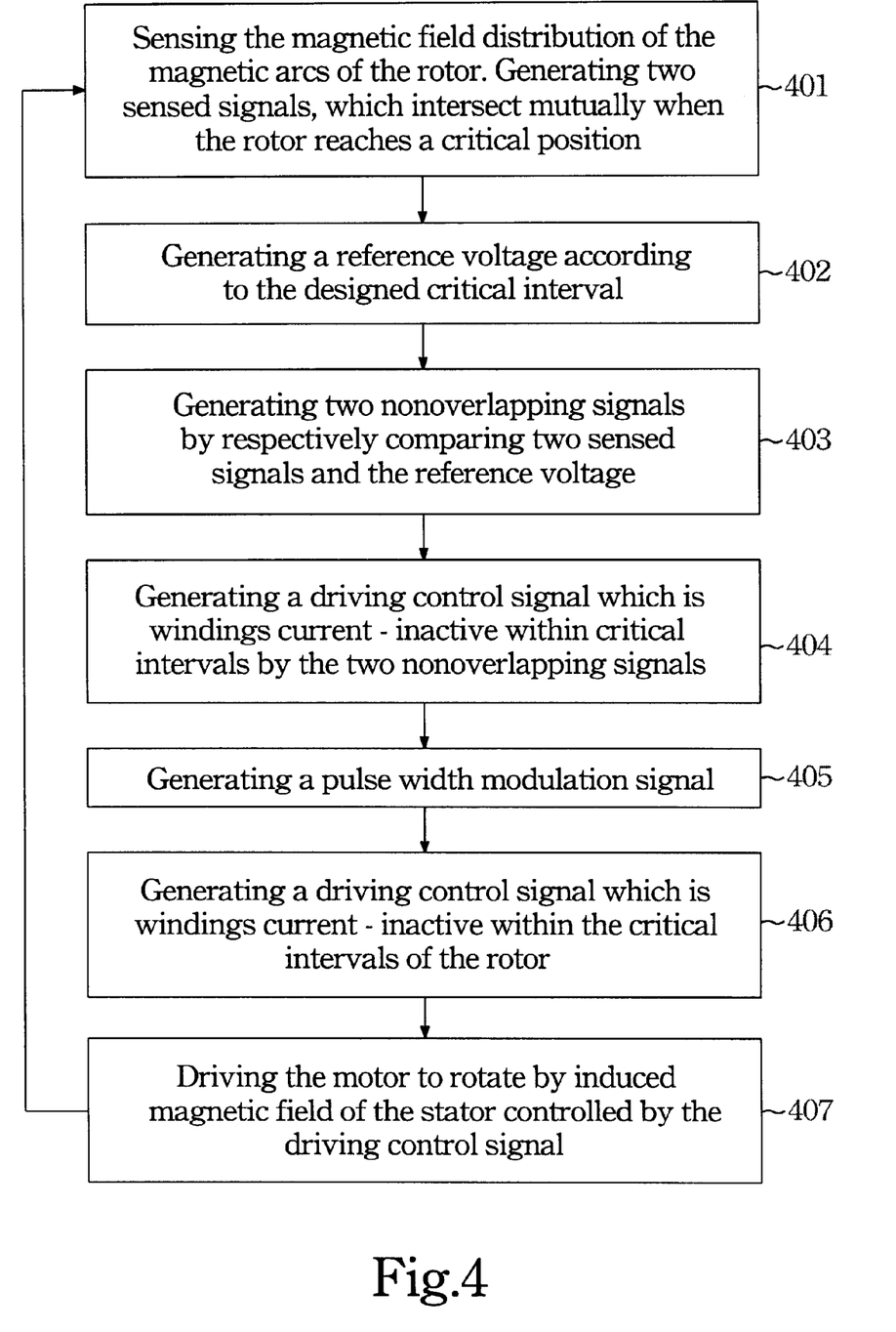
FIG. 4 is a flow chart in one preferred embodiment according to the present invention, which describes a method for driving the brushless DC motor.
Figure 5:
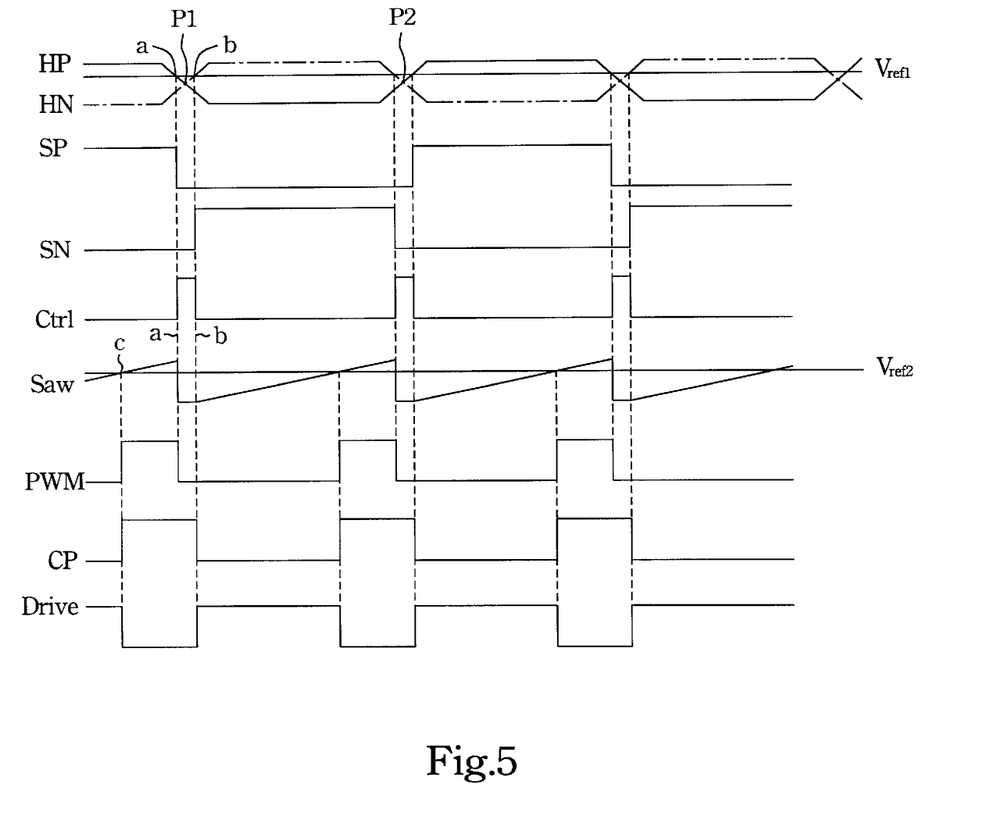
FIG. 5 shows sensed and control signal timing, which are used in FIG. 4.

In FIG. 4, the flow chart according to the present invention's preferred embodiment is depicted therein. In the preferred embodiment, a Hall sensor is located along the angle bisector of two neighboring stator arms and they are used for sensing the rotor's magnetic arc magnetic field distribution. Upon the sensed information is acquired, two sensed signals HP and HN are generated successively (Step 401). In FIG. 5, the sensed signals and control signals used in the invention are shown therein. The two sensed signals HP and HN generated by the Hall sensor are equal in magnitude but opposite in logic level. Between the two signals, the crossings of the two signals mean the rotor's arcs are rotated to the critical positions. During P1, the rotor is rotated to the critical position. When the rotor is rotated to be within the critical interval corresponding to the time a little more or less than P1, the sensed signal HP is gradually decreased in its signal level from a first level to a second level. When the rotor is then rotated to be within the critical interval associated with the time a little more or less than P2, the sensed signal HP is gradually increased in its signal level from the second level to the first level. As for the HN signal, its behavior of level change is just the opposite to the HP signal. The difference between the first level and the second level is called the saturated output voltage difference.

Next, a first reference voltage $V_{ref1}$ is generated according to the designed interval of the critical interval. Therefore, the interval between the crossing of the HP signal and the voltage $V_{ref1}$, time point a, to the time P1 plus the interval between the crossing of the HN signal and the voltage $V_{ref1}$, time point b, to the time P1 is defined as the critical interval (Step 402). HP and HN signals are respectively fed into two comparators with the voltage $V_{ref1}$ as a reference voltage respectively, and thus two non-overlapping signals SP and SN are generated (Step 403). The SP signal is in high level when the HP signal is larger than the voltage $V_{ref1}$, while it is in low level when the HP signal is less than the voltage $V_{ref1}$. Likewise, The SN signal is in high level when the HN signal is larger than the voltage $V_{ref1}$, while it is in low level when the HN signal is less than the voltage $V_{ref1}$. As described above, the signals SP and SN are two non-overlapping signals because SP and SN are not both in high level when the reference voltage $V_{ref1}$ is larger than the average of the low level and the high level voltage. In fact, the two non-overlapping signals SP and SN are both in a low level state at the interval of a to b. Thus, the rotor's angular position at the time interval (a,b) is chosen to be a critical interval according to the scheme mentioned above.

When the two non-overlapping signals SP and SN are both in a low level state, the high-level interval (a,b) of the Ctrl signal is generated which indicates an inactive state where no current flows through the stator windings; otherwise, the Ctrl signal is in a low level state (Step 404). To achieve such a signal as the Ctrl signal, SP and SN signals are applied to an OR or NOR logic gate. In the case when the logic gate used for SP and SN signals is an OR gate, low level state of the Ctrl signal is indicative of the inactive state of the stator. While in the other case when the logic gate used for SP and SN signals is a NOR gate, high level state of the Ctrl signal is indicative of the inactive state of the stator. In FIG. 5, the logic gate used is a NOR gate and thus the high level interval is indicative of the inactive state of the stator's current windings. Using the Ctrl signal as a driving control signal, the stator will generate no magnetic field when the rotor is within the critical interval while generate magnetic field when the rotor is not within the critical interval. In accordance with the aforementioned driving control signal, a winding current-inactive driving method is achieved.

As mentioned above, the Ctrl control signal is used to formulate the rotating behavior of the motor. Furthermore, the rotating speed of the motor can be regulated by combining the Ctrl signal with some other signals. In one embodiment according to the present invention, a PWM signal is generated to go with the Ctrl signal to achieve this. The introduction of the PWM signal means the Pulse Width Modulation method is adopted herein. At first, generating a PWM signal (Step 405) by feeding a second reference signal $V_{ref2}$ and a saw-shaped signal Saw into a comparator, wherein the Saw signal can be obtained by charging and discharging a capacitor. When the control signal Ctrl is applied to control the on-and-off operation of the discharging path, the resulted Saw signal will have lowest voltage level when the rotor is within the critical position.

The PWM is in high level state when the voltage of the Saw signal is larger than the second reference voltage. In contrast, the PWM will be in low level state when the voltage of the Saw signal is smaller than that of the second reference voltage. Within the critical intervals, the PWM must be in a low level state since the Saw signal reaches the lowest voltage level. Adjustments of the high level interval of the PWM signal are possible since the level states of the PWM signal are dependent on the second reference signal $V_{ref2}$. By adjusting the second reference voltage level, adjustments of the high level intervals, which indicates an active state for the current of the stator windings, of the PWM signal is achieved. To achieve a higher rotating speed, the high level intervals of the PWM signal must be increased since the maximum rotating speed is proportional to the high level intervals of the PWM signal.

In addition, the control of the rotating speed of the motor can be achieved in another manner. The PWM and Ctrl signals are logically OR-ed to generate a CP signal, which is in charge of control of the rotating speed. The CP signal is high within the critical interval (a,b) and the high level interval of the PWM signal (c,a). Then, the CP signal is inverted to obtain a driving signal driver (Step 406). Finally, the driving signal driver is used for driving the motor (Step 407), and the control of the motor's rotating speed and the interval based current winding inactive driving are simultaneously achieved.

Figure 6:
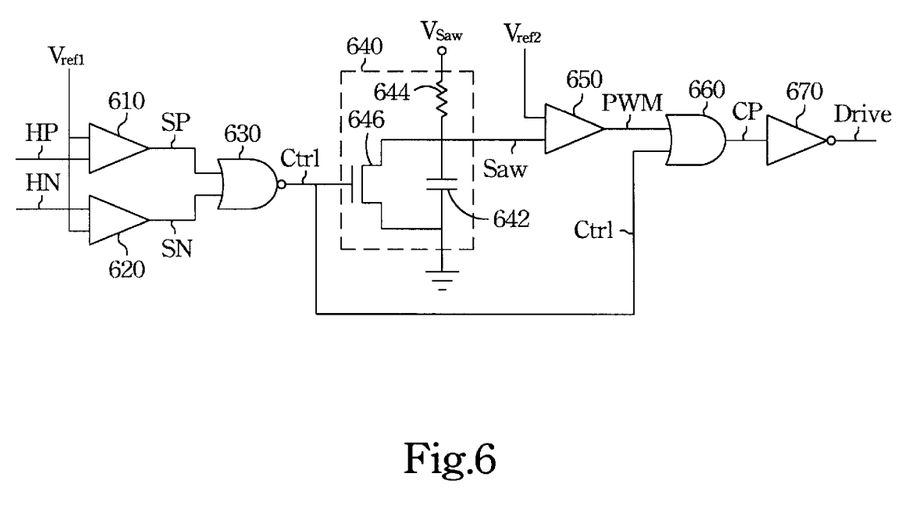
FIG. 6 shows circuit realization for the driving method described in FIG. 4.

FIG. 6 shows the circuit realization for the preferred embodiment shown in FIG. 4. The comparator 610 and 620 are fed respectively with two sensed signals HP and HN from the Hall sensor and each of them is compared with the first reference signal $V_{ref1}$. By the comparisons, two non-overlapping signals SP and SN are generated. Next, the SP and SN signals are logically NOR-ed through a NOR logic gate 630 to obtain the control signal Ctrl, which is in high level state within the critical intervals. The Ctrl signal is next used to control the discharging intervals of the saw-shaped wave generation circuit 640 to obtain the Saw signal, which is low in logic level within the critical intervals.

In an embodiment, the saw-shaped wave generation circuit 640, served as a switch) is composed of a capacitor 642, a resistor 644 and a FETMOS 646. The gate of the FETMOS 646 is fed with Ctrl signal, the source and the drain are respectively connected to two ends of the capacitor 642, where one end is grounded and the other is coupled to a power source $V_{saw}$. The output, Saw signal, of the circuit 640 is fed into a comparator 650. The comparator 650 compares the Saw signal and the second reference voltage $V_{ref2}$ to conduct a pulse width modulation and then output a modulated signal PWM.

The PWM and Ctrl signals are then fed into an OR gate 660 to conduct a logic operation. The output of the OR gate 660 is a speed controlling signal CP, which is then inputted into an inverter 670. The CP signal is inverted by the inverter to a driving signal driver. The driving signal is used to drive the motor in an interval based current windings-inactive manner.

According to aforementioned driving method and driving circuit, the present invention achieves in controlling the rotation of the motor in an interval based current windings-inactive manner. Based on the sensed signals HP and HN, a driving control signal, which makes the current of the stator inactive in critical intervals, is issued. Within critical intervals, no induced magnetic field of the stator windings is present owing to the inactive current flowing through the stator windings. Since no current controlled by the driving control signal flows through the stator windings within critical intervals, no current commutation, and thus no electrical signal delay, is occurred. Therefore, no interactive magnetic force opposite to the rotating direction of the rotor, inhered in the prior art, is exerted. Additionally, coupled with the pulse width modulation (PWM) method, the rotor can rotate with some fixed speed by adjusting the ratio of the critical interval to the uncritical interval.

All the control signals such as Ctrl, the pulse width modulation signal PWM, the speed controlling signal CP and the driving signal driver as mentioned above can serve the purpose of driving the stator's current windings to flow in an interval based current windings inactive manner. Additionally, logic levels of all signals mentioned in the detailed description can be replaced by the opposite logic levels with the corresponding circuit to pursuit the same goal according to the present invention. For example, conducting a NOR logic operation over two signals is identical to inverting two signals, respectively first. Then conducting an AND logic operation over the two inverted signals, and conducting an OR logic operation over two signals is identical to inverting two signals respectively first. Then conducting an NAND logic operation over the two inverted signals, and the like. Therefore, replacing all logic gates shown in the circuit in FIG. 6 by the corresponding logic gates is practicable.

As is understood by a person skilled in the art, the foregoing preferred embodiments of the present invention are illustrations of the present invention rather than limitations of the present invention. It is intended to cover various modifications and similar arrangements included within the spirit and scope of the appended claims, the scope of which should be accorded the broadest interpretation so as to encompass all such modifications and similar structure.

What is claimed is:

1. A method for driving a brushless DC motor, in said method, an induced magnetic field of windings current on a stator exerts a force tangent to a rotor on a plurality of magnetic arcs of said rotor to drive said rotor to rotate in a predetermined direction, wherein said induced magnetic field of said windings current on said stator will exert a reverse force on said plurality of magnetic arcs of said rotor tangent to said rotor on said plurality of magnetic arcs of said rotor, then a direction of said induced magnetic field of said windings current on said stator interchanges, and then drive said rotor to keep in rotating in said predetermined direction when said rotor reaches a critical angular position, said method comprises the steps of:

sensing a magnetic field of said rotor;

generating a driving control signal, wherein said windings current is inactive by said driving control signal when said rotor rotates to be within a specific angular distance from said critical angular position;

controlling said induced magnetic field of said windings current on said stator to be generated and commuted based on said driving control signal wherein said induced magnetic field of said windings current on said stator is controlled to be zero when said windings current is inactive by said driving control signal; and driving said rotor to rotate according to said force tangent to said rotor exerted by said induced magnetic field of said windings current on said stator.

2. The method according to claim 1, wherein said sensing said magnetic field of said rotor is conducted by a Hall sensor.

3. The method according to claim 1, wherein a first sensed signal and a second sensed signal are generated based on said magnetic field of said plurality of magnetic arcs of said rotor in the step of sensing said magnetic field of said rotor, wherein said first sensed signal is changed gradually from a first sensed level to a second sensed level, while said second sensed signal is changed gradually from said second sensed level to said first sensed level when said rotor rotates to be within said specific angular distance from said critical angular position.

4. The method according to claim 3, wherein the step of generating said driving control signal further comprises the steps of:

generating a first reference signal to define a windings current-inactive interval, wherein said windings current-inactive interval includes said critical angular position;

generating a first nonoverlapping signal corresponding to said first sensed signal, wherein said first nonoverlapping signal is in a first control level when a level of said first sensed signal is larger than a level of said first reference signal level, while said first nonoverlapping signal is in a second control level when said level of said first sensed signal is larger than said level of said first reference signal level;

generating a second nonoverlapping signal corresponding to said second sensed signal, wherein said second nonoverlapping signal is in a first control level when a level of said first sensed signal is larger than a level of said first reference signal level, while said second nonoverlapping signal is in a second control level when said level of said second sensed signal is less than said level of said first reference signal level; and setting said first nonoverlapping signal and said second nonoverlapping signal to be said driving control signal.

5. The method according to claim 4, wherein said first nonoverlapping signal and said second nonoverlapping signal are at a same level within said windings current-inactive interval to inhibit said windings current on said stator to produce induced magnetic field.

6. The method according to claim 4, wherein said generating said induced magnetic field by said windings current on said stator is generated and controlled by a control signal, wherein said control signal outputs an inactive indication level for said windings current on said stator, wherein said windings current on said stator produces no magnetic field when said first nonoverlapping signal and said second nonoverlapping signal are at a same level.

7. The method according to claim 6, wherein said generating induced magnetic field by windings current on said motor stator is generated and controlled by a pulse width modulation signal, wherein said pulse width modulation signal separates an interval where said first nonoverlapping signal and said second nonoverlapping signal are not at a same level into a first speed controlling interval and a second speed controlling interval and outputs said inactive indication level within said windings current-inactive interval and said first speed controlling interval while outputs an active indication level within said second speed controlling interval, wherein said windings current generates induced magnetic field within said active indication level interval.

8. The method according to claim 7, wherein an interval ratio of said second speed controlling interval to said first speed controlling interval is determined by a designed speed, wherein said interval ratio is proportional to a rotating speed of said rotor.

9. The method according to claim 7, wherein said generating induced magnetic field by said windings current on said motor is generated and controlled by a speed controlling modulation signal, wherein said speed controlling modulation outputs said inactive indication level within said windings current-inactive interval and said second speed controlling interval while outputs said active indication level within said first speed controlling interval.

10. The method according to claim 4, wherein generating said induced magnetic field by windings current on said stator is generated and controlled by a driving circuit, said driving circuit comprises:
- a first comparator, containing two input ends and one output end of said first compartor, wherein said two input ends of said first comparator are respectively coupled to said first sensed signal and said first reference signal;
- a second comparator, containing two input ends and one output end of said second compartor, wherein said two input ends of said second comparator are respectively coupled to said second sensed signal and said first reference signal; and
- a logic gate, defining a same level interval which a level of an output signal of said first comparator is different from a level of an output signal of said second comparator to form a basis for said driving control signal, wherein said logic gate includes two logic input ends and one logic output end, wherein said two logic input ends are respectively coupled to said output end of said first comparator and said output end of said second comparator.

11. The method according to claim 10, wherein said driving circuit further comprises a pulse width modulation circuit, wherein said pulse width modulation circuit comprises a control end, a reference end, a pulse width modulation output end, a ground end and a power supplying end, wherein said control end is coupled to said logic gate, said ground end to a ground, and said power supplying end to a power supply.

12. The method according to the claim 11, wherein said pulse width modulation circuit comprises:
- a saw-shaped signal generation circuit, comprising said control end, said ground end, said power supplying end and a saw-shaped signal output end; and
- a third comparator, comprising two input ends and one output end of said third comparator, wherein said two input ends of said third comparator are respectively said reference end and said saw-shaped signal output end, while said output end of said third comparator is said pulse width modulation output end.

13. The method according to the claim 12 wherein said saw-shaped signal generation circuit comprises:
- a capacitor, including said saw-shaped signal output end and said ground end;
- a resistor, one end of said resistor is coupled to said saw-shaped signal output end, while the other end of said resistor is coupled to said power supplying end; and
- a switch, coupled to a joint of said saw-shaped signal output end of said capacitor and said ground end, and having said control end.

14. The method according to the claim 11, wherein said driving circuit further comprises a second logic gate, combining an output signal of said first logic gate and said output signal of said pulse width modulation circuit into a signal with a high level interval which is composed of a high level interval of said output signal of said first logic gate and a high level interval of said output signal of said pulse width modulation circuit, forming a basis for said driving control signal, wherein said second logic gate includes two input ends and an output end of said second logic gate, wherein said two input ends of said second logic gate are respectively coupled to said output end of said pulse width modulation and said output end of said first logic gate.

15. The method according to claim 14, wherein said second logic gate is an OR gate.

16. The method according to claim 15, wherein said driving circuit further comprises an inverter, said inverter comprises an input end and an output end of said inverter, wherein said input end of said inverter is coupled to said output end of said OR gate.

17. The method according to claim 1, wherein said specific angular distance from said critical angular position is determined by comparing a reference signal and said first sensed signal and said second sensed signal having information of said magnetic field of said motor rotor.

18. The method according to claim 1, wherein said driving control signal is generated by accompanying with a pulse width modulation method to generate said driving control signal capable of achieving in speed control over said rotor.

19. A driving circuit for driving a brushless DC motor, receiving two sensed signals from a sensor to generate a motor driving signal, said driving circuit comprises:
- a first comparator, comprising two input ends and one output end of said first comparator, wherein said two input ends of said first comparator are respectively coupled to one of said two sensed signals from said sensor and a reference signal;
- a second comparator, comprising two input ends and one output end of said second comparator, wherein said two input ends of said second comparator are respectively coupled to the other of said two sensed signals and said reference signal;
- a logic gate, defining a same level interval in which a level of an output signal of said first comparator is the same as a level of an output signal of said second comparator to be as a basis of forming said motor driving signal, wherein said logic gate comprises two input ends and one output end, wherein said two logic input ends are respectively coupled to said output end of said first comparator and said output end of said second comparator;
- a pulse width modulation circuit coupling with said logic gate and according to said same level interval defined by said logic gate to generate a PWM signal; and
- a logic gate group coupling with said pulse width modulation circuit for receiving said PWM signal and according to said same level interval defined by said logic gate and said PWM signal to generate said motor driving signal.

20. The driving circuit according to claim 19, wherein said pulse width modulation circuit further comprises:
- a saw-shaped signal generation circuit coupling with said logic gate and according to said same level interval defined by said logic gate to generate a saw-shaped signal; and
- a comparator coupling with said saw-shaped signal generation circuit for receiving said saw-shaped signal to compare with a predetermined voltage to generate said PWM signal.

21. The driving circuit according to claim 20, wherein said saw-shaped signal generation circuit further comprises:
- a switch transistor coupling with said logic gate for switching according with said same level interval defined by said logic gate; and
- a capacitor connecting with said switch transistor in parallel, wherein said capacitor may charge and discharge electricity according to the switching of said switch transistor.

22. The driving circuit according to claim 19, wherein said logic gate group comprises an OR logic gate coupling with said pulse width modulation circuit for receiving said PWM signal to combine said same level interval defined by said logic gate into a signal with a high level interval.

* * * * *